United States Patent [19]

Zdanovsky et al.

[11] 4,103,915

[45] Aug. 1, 1978

[54] CENTERING CLAMPING DEVICE

[76] Inventors: Mikhail Romanovich Zdanovsky, ulitsa Chernyakhovskogo, 4a, kv. 50; Viktor Vasilievich Minashin, ulitsa Shukhova, 5/7, kv. 58; Vladimir Yakovlevich Nikolaev, Yaltinskaya ulitsa, 12, kv. 17; Viktor Alexandrovich Razuvaev, Varshavskoe shosse, 3, linia, 12, kv. 13; Ivan Petrovich Perelygin, Avtozavodskaya ulitsa, 17, korpus 1, kv. 15; Stanislav Leonidovich Mikhaevich, ulitsa Chernyakhovskogo, 9, korpus 3, kv. 286; Lev Samuilovich Dridze, ulitsa Guryanova, 3, kv. 41, all of, Moscow, U.S.S.R.

[21] Appl. No.: 748,365

[22] Filed: Dec. 7, 1976

[51] Int. Cl.[2] .............................................. B23B 31/16
[52] U.S. Cl. .................................. 279/119; 279/1 L; 279/110
[58] Field of Search ............... 279/119, 120, 110, 1 L, 279/1 J

[56] References Cited

U.S. PATENT DOCUMENTS

| 2,224,639 | 12/1940 | Ward | 279/119 |
|---|---|---|---|
| 3,751,053 | 8/1973 | Swanson | 279/119 |

*Primary Examiner*—Gil Weidenfeld
*Attorney, Agent, or Firm*—Robert E. Burns; Emmanuel J. Lobato; Bruce L. Adams

[57] ABSTRACT

Six clamping jaws are uniformly spaced in a housing. The jaws are arranged on guideways for reciprocation toward and away from the center of the housing. Adjacent jaws are interconnected by driving trains, forming three groups of symmetrically arranged pairs. All the jaws are associated with a single common drive, each driving train includes a slide block operatively connected to this drive and situated on the bisector of the angle made up by two adjacent guideways. The slide block carries a freely rotatable member likewise situated on the bisector of the angle and operatively connected with each jaw of the respective pair.

9 Claims, 16 Drawing Figures

CENTERING CLAMPING DEVICE

FIELD OF USE OF THE INVENTION

The present invention relates to centering clamping devices or chucks and can be utilized in machine tools, e.g. in multi-spindle and single-spindle lathes and boring machines, for dependable centering and securing of both rigid and, particularly, inadequately rigid workpieces with sharply pointed jaws, with the workpiece being clamped by its unmachined base or reference surface, so that the workpiece thus clamped can be machined at a high rate and with a high accuracy.

BACKGROUND OF THE INVENTION

There are widely known self-centering triple-jaw chucks for securing workpieces to be machined in lathes and boring machines, comprising a central driven rod actuating through a system of effort-transmitting members three radially movable jaws uniformly spaced in the housing of the chuck.

The use of such chucks, particularly when workpieces are machined in multi-station machine tools with a considerable cutting effort, more often than not results in considerable elastic deformation of the workpiece being machined, such deformation being capable of distorting beyond the permissible tolerance the shape of the surfaces being machined, particularly when the workpiece is inadequately rigid. This distortion of the shape is the more significant, the greater the requirements are concerning the precision of the machining of the surfaces, the abovementioned elastic deformation also influences the precision of the working of articles which can be considered rigid.

To reduce this distortion of the shapes of the surfaces being machined, in other known devices each jaw of a triple-jaw chuck is provided with a rockable clamping member, which enables the chuck to secure a workpiece by the efforts of the three pairs of clamping elements, the elements of each pair extending parallel with each other. However, in this case the clamping elements of the jaws cut into the workpiece since the elements do not move strictly toward the axis of the chuck, so that the chuck is practically incapable of centering and securing the workpiece with the required accuracy. Furthermore, with the jaws provided with rockable clamping elements, the rigidity of the chuck is somewhat affected, the same as the workpiece-holding capacity thereof. Besides, the torque created by the cutting effort might result in the rearrangement of the clamping forces acting upon the workpiece, and, hence, in misbalance of these forces.

Thus, the abovedescribed known chucks do not ensure reliable centering of workpieces, do not eliminate elastic deformation, to say nothing of their workpiece-holding capacity being impaired, which affects the overall productivity of the machining process. To attain the required high accuracy of the machining of a workpiece, it becomes necessary to introduce additional operations, either pre-machining or finishing operations with the resultant decreased productivity of the machining process. Costs and the amount of labour consumed are significantly increased.

Recently, in order to improve the accuracy of turning operations, attempts have been made to create self-centering chucks for securing workpieces by their unmachined base or reference surfaces, with the use of six radially reciprocable jaws. These last-mentioned chucks have two groups of jaws uniformly spaced about the circumference of the chuck, the two groups being actuated by two separate drives, viz. one group of three jaws is actuated by a mechanical drive, while the other group is actuated manually. In other cases both groups are actuated by a manual drive of a successive action; in still other cases both groups of the jaws are actuated by two independed mechanical drives.

The swiftness of the action of the last-mentioned clamping chucks is inadequate; this means that additional time is required to position and secure a workpiece; besides, these chucks fail to ensure accurately timed application of the clamping forces by all the jaws, which would not provide for complete elimination of elastic deformation of workpieces which are not adequately rigid. Moreover, the last-described chucks have a complicated and bulky structure, which practically precludes their employment in several types of machine tools, e.g. in automatically operated ones.

SUMMARY OF THE INVENTION

It is an object of the present invention to improve the accuracy and productivity of the machining of workpieces being secured by their either machined, or, in particular, unmachined reference surface, even when this unmachined surface undergoes considerable distortion.

It is another object of the present invention to create a reliably performing chuck of an uncomplicated structure, this radial centering clamping chuck being capable of securing workpieces of different sizes with an effort which is uniform for each one of six radially reciprocable jaws uniformly spaced about the circumference of the chuck.

These and other objects are attained in a centering clamping chuck including a plurality of clamping jaws uniformly spaced within the housing of the chuck. The jaws are accommodated on radial guideways for reciprocation toward and away from the central axis of the housing, to guide a workpiece into a position centrally of the housing and to retain the workpiece in this position, in which chuck, in accordance with the present invention, the adjacent pairs of the clamping jaws are interconnected each by a driving train, so that at least three groups of symmetrically arranged pairs are formed. The chuck has a single actuating drive common to all of the pairs of the jaws, for timed actuation of these jaws. Each driving train includes an element connected to the common drive, mounted for motion along the bisector of the angle between the guideways of the respective pair of the jaws. This element carries a freely rotatable member having the axis of rotation thereof situated on the bisector of the said angle. This freely rotatable member is operatively connected to each jaw of the respective pair, for moving either of the jaws into engagement with the workpiece upon the other jaw having contacted the workpiece.

An asset of the herein disclosed centering clamping chuck is that it promotes a higher accuracy of the machining, owing to the reduction to approximately one tenth elastic deformation of the workpiece, in comparison with the clamping of a workpiece in a triple-jaw chuck, with the same clamping effort applied to each jaw, the workpiece-holding capacity of the chuck is increased about twofold also with the same effort applied to each jaw, whereby additional operations aimed at attaining the high accuracy of the machining may be eliminated.

The herein disclosed chuck can be widely used to handle both relatively small and big workpieces in vertical and horizontal, single- and multi-spindle lathes and boring machines, including those operated in an automatic mode.

According to one embodiment of the present invention, each driving train includes a driven slide block situated on the bisector of the angle between two adjacent guideways accommodating the respective clamping jaws. This slide block has mounted thereon a pivotable bell crank with two identical arms with a cylindrical head on the end of each arm. The head is connected to the respective jaw via an effort-transmitting bell crank having in the extremity thereof, facing the cylindrical head. A groove accommodates a movable block cooperating with the cylindrical head of the respective arm, the other extremity of the effort-transmitting bell crank has a cylindrical head received in a groove in the body of the respective jaw and cooperating with the latter with aid of a movable block.

In another embodiment of the present invention each driving train includes a slide block situated on the bisector of the angle between two adjacent guideways accommodating the respective clamping jaws. The slide block carries thereon a rotatable pinion. Each clamping jaw of the respective pair has a rack cooperating with the pinion on the slide block via a member having a toothed segment on the side thereof, facing the jaw, and a toothed rack on the opposite side thereof.

Alternatively, each driving train may have a slide block situated on the bisector of the angle between two adjacent guideways accommodating the respective pair of the jaws. The slide block carries thereon a rotatable pinion operatively connected with the toothed rack mounted on each one of the respective pair of the jaws through a couple made up by a double-sided toothed rack and a pinion.

According to still another embodiment of the present invention, each driving train includes a slide block carrying thereon a freely pivotable rocker with identical arms, with a cylindrical head on the end of each arm, received in a groove made in the respective jaw and cooperating with the latter via a movable block.

According to yet another embodiment of the present invention, each driving train includes a slide block carrying thereon two adjacent bell cranks pivotable in the planes of the reciprocation of the respective ones of the jaws. The housing of the chuck accommodates an axially movable coupling, concentric about the longitudinal axis of the housing and operatively connected with the actuating rod of the drive. The coupling carries three stems extending along the bisectors of the respective angles between the guideways of the pairs of the adjacent jaws, each stem carrying yet another bell crank cooperating with the abovementioned bell cranks so that the latter are pivotable in the planes of the reciprocation of the respective jaws. In this embodiment the another bell crank rocks in a plane parallel with the reciprocation of the actuating rod, yet perpendicular to the longitudinal plane including the bisector of the angle between the guideways.

BRIEF DESCRIPTION OF THE DRAWINGS

The present invention will be further described in connection with the embodiments thereof in the structure of a centering clamping chuck, with reference being had to the accompanying drawings, wherein.

DESCRIPTION OF THE PREFERRED EMBODIMENTS

Figure 2:
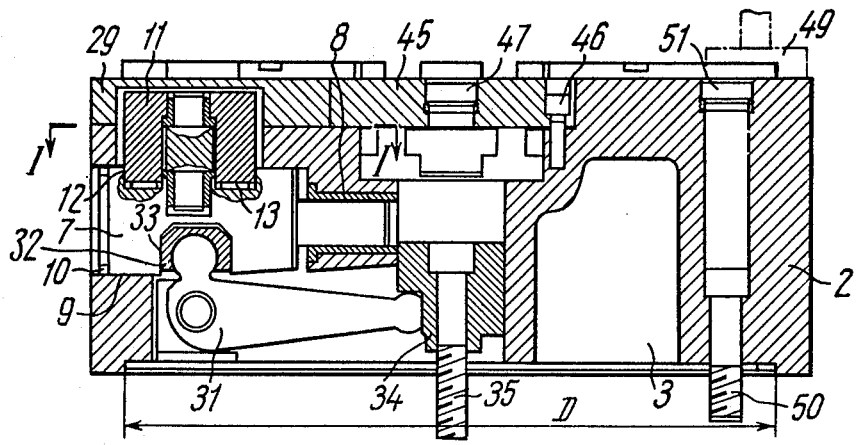
FIG. 2 is a sectional view taken on section line II—II of FIG. 1.

Let us now refer to FIGS. 1 to 4 showing one of several modifications of a centering clamping chuck embodying the invention, indicated generally with numeral 1.

This chuck 1 has a monolithic rigid cylindrical housing 2 with cutaway portions or pockets 3 reducing the weight of the housing 2. The housing 2 has mounted or made therein six radially extending guideways 4 uniformly spaced in the housing and supporting thereon replaceable jaws which are reciprocable in the housing toward and away from the centre of this housing 2, as indicated with arrow 6. The adjacent jaws 5 are interconnected in pairs by respective driving trains, so that at least three groups of symmetrically arranged pairs of the jaws 5 are formed. Since all these driving trains in the chuck are identical, only one such train is shown in detail in FIG. 1 and will be discussed hereinbelow.

Figure 1:
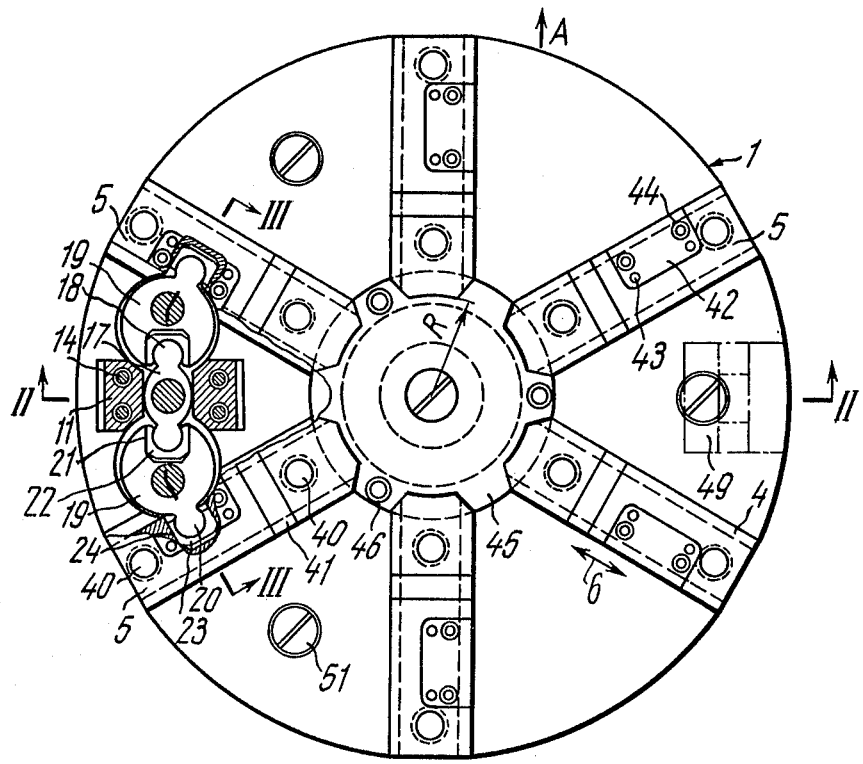
FIG. 1 is a partly cut away plan view of a centering clamping chuck in accordance with the invention.
Figure 3:
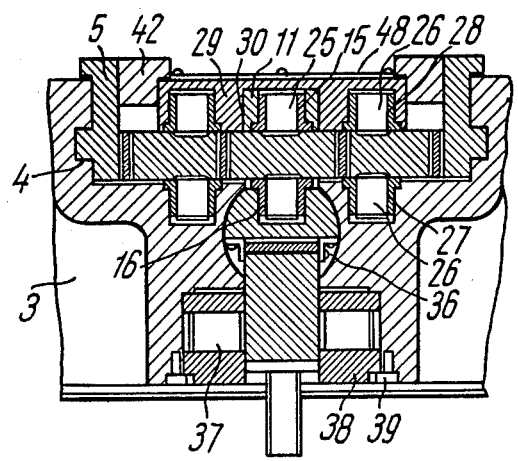
FIG. 3 is a sectional view taken on section line III—III of FIG. 1.
Figure 4:
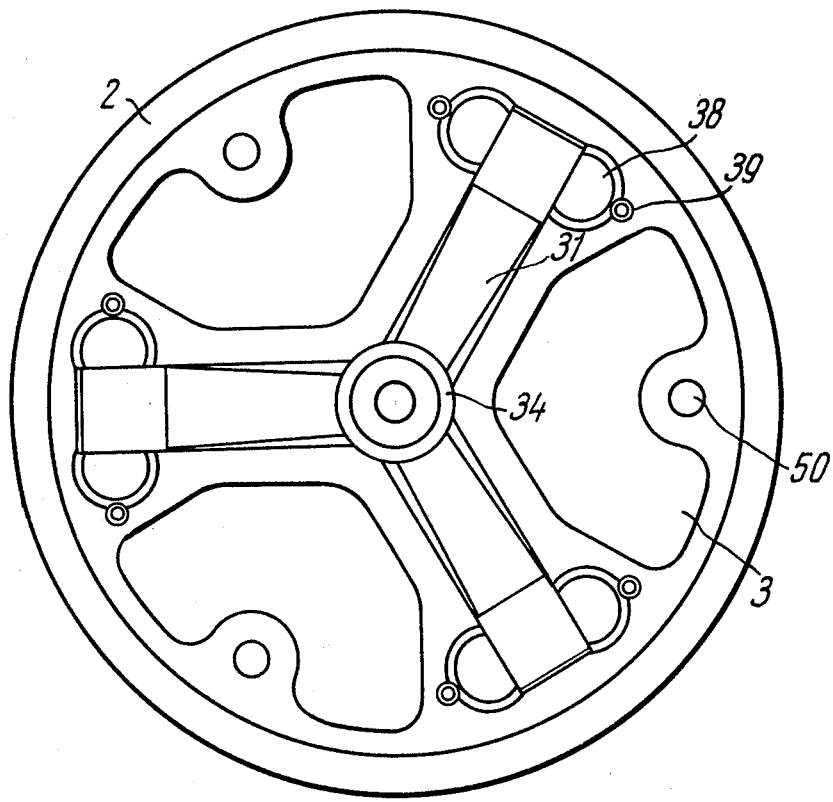
FIG. 4 is a view along arrow A in FIG. 2.

The driving or actuating train in FIG. 1 includes a slide block 7 situated in the housing 2 of the chuck 1 on the bisector of the angle formed by the respective pair of the guideways 4 of the adjacent jaws 5. The front or centre-facing portion of the slide block 7 is received in a bushing 8 pressure-fit into the central part of the housing, while the rear or remote from the centre portion of the slide block 7 is received in a counterbore 9 in the housing 2, coaxial with the bore in the bush 8 and provided with a seal 10. The slide block 7 is provided with a holder 11 which is received in a free-of-play fashion in a precision-cut groove 12 in the housing 2, the holder 11 being retained in this groove 12 by keys 13 and being secured to the slide block 7 with screws 14, so that the axis of the bore 15 in the holder 11 is aligned with the axis of the bore 16 in the slide block 7.

Each one of the driving or actuating trains of the presently described embodiment includes also a two-arm lever or bell crank 17 with a cylindrical head 18 on the end of each arm, and also a pair of intermediate two-arm levers or bell cranks 19, each having a cylindrical head 20, and a groove 21 on the end thereof, facing the bell crank 17. This groove 21 accommodates a movable block 22 engaging the cylindrical head 18 of the bell crank 17.

The cylindrical head 20 of each bell crank 19 is received in a movable block 23 accommodated in a groove 24 made in the respective jaw 5.

The bell crank 17 has its journals 25 received, respectively, in the bore 15 of the sleeve pressure-fit in the holder 11 and in the bore of the sleeve 16 pressure-fit in the slide block 7, so that the bell crank 17 is freely rotatable in these bores.

Each intermediate bell crank 19 has its journals 26 received, respectively, in the bore of a sleeve 27 pressure-fit in the housing 2 and in the bore of a sleeve 28 pressure-fit in a lid 29.

The holder 11 is received in a precision-cut groove 30 in the lid 29, the axis of this groove 30 being aligned with the axis of the bore 16 in the slide block 7, so that the holder 11, which is fast with the slide block 7, is reciprocable radially of the housing 2 along this groove 30, i.e. toward and away from the centre of the chuck 1.

The lid 29 is precisely positioned on the housing 2 by means of pilot pins and is secured with screws to the housing (the pins and screws are not shown in the drawings), so that there is ensured positive alignment of the bore 16 in the slide block 7 and the groove 30 in the lid 29, as well as that of the bores 27 in the housing 2 with the respective bores 28 in the lid 29.

The slide block 7 is radially reciprocated by a bell crank 31 having one arm thereof connected with a movable block 32 received in a groove 33 cut in the slide block 7, the other arm of the bell crank 31 being connected to a coupling 34 received in the hosuing 2 of the chuck 1 and connected via a screw 35 with an actuating rod (not shown).

The block 32 received in the groove 33 of the slide block 7 is retained from lateral displacement by abutments 36. The bell cranks 31 has its journals 37 received in the bearing bores of sleeves 38, the latter being mounted in the respective sockets provided in the housing 2 and retained therein by screws 39.

Each jaw 5 has threaded openings 40 for securing to this jaw replaceable clamping members, and a key slot 41 located with respect of the centre of the chuck such that the distances between this centre and the axes of these slots of the jaws 5 are equal throughout the chuck.

The slot 24 of each jaw 5, receiving therein the block 23, is closed off with an insert 42 kept in position with pins 43 and fastened to the jaw 5 with screws 46.

The bore in the driving coupling 34 is closed with a disc 45 fastened to the housing 2 with screws 46.

A threaded plug 47 closes the bore in the disc 45, this bore is used to connect the coupling 34 with an actuating rod by means of the screw 35. The surface of each lid 29 is covered with a thin steel plate 48, to provide better conditions for removing the shavings produced during a machining operation.

The unoccupied surface of the housing 2 can be used, whenever required, to support thereon a driver for actuating a planetary drilling head when the latter is used in multistation lathes. When the chuck 1 is mounted either on the face plate of the work spindle of a lathe, or on an intermediate faceplate, the centering annular shoulder "D" on the bottom of the housing 2 is used. The chuck 1 is secured with three bolts 50, threaded plugs 51 closing off the bores made through the housing 2 to accommodate these bolts 50.

Figure 5:
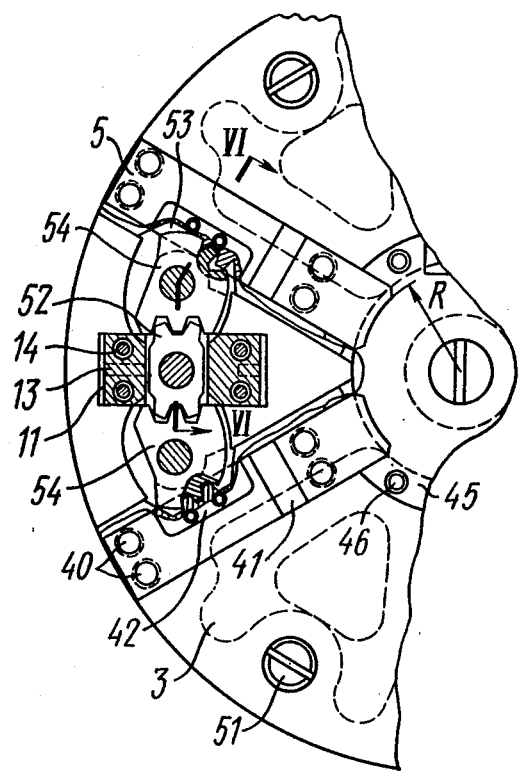
FIG. 5 is a fragmentary plan view of a modification of the centering clamping chuck shown in FIG. 1, with a different connection of the slide blocks with the jaws.
Figure 6:
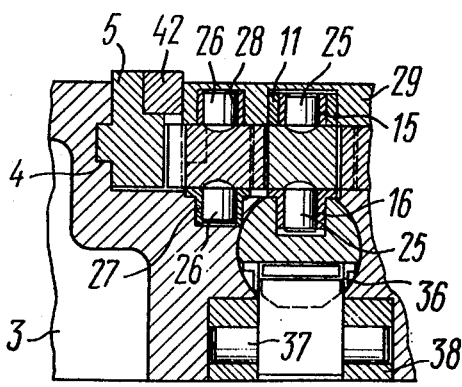
FIG. 6 is a sectional view taken on section line VI—VI of FIG. 5.

Let us now refer to FIGS. 5 and 6 illustrating another embodiment of the driving train interconnecting two adjacent jaws in the centering clamping chuck embodying the invention. The chuck in FIGS. 5 and 6 is similar to the chuck shown in FIGS. 1 to 4, differing therefrom only in the structure of the driving train, positions in FIGS. 5 and 6, identical to those in FIGS. 1 to 4, are identified with the same reference numerals.

Each driving train in the embodiment shown in FIGS. 5 and 6 includes, in addition to the above-described slide block and holder, a pinion 52 mounted for rotation in the holder 11 on the slide block 7 and meshing with the respective rack 53 on each replaceable jaw 5 of the pair through an intermediate member 54 of which one extremity is a toothed segment meshing with the toothed rack 53 of this jaw 5, and the other extremity is a toothed rack meshing with the pinion 52. This embodiment simplifies the structure of the clamping effort transmitting mechanism and can be incorporated in chucks of a smaller diameter, with a relatively small stroke of the jaws.

Figure 8:
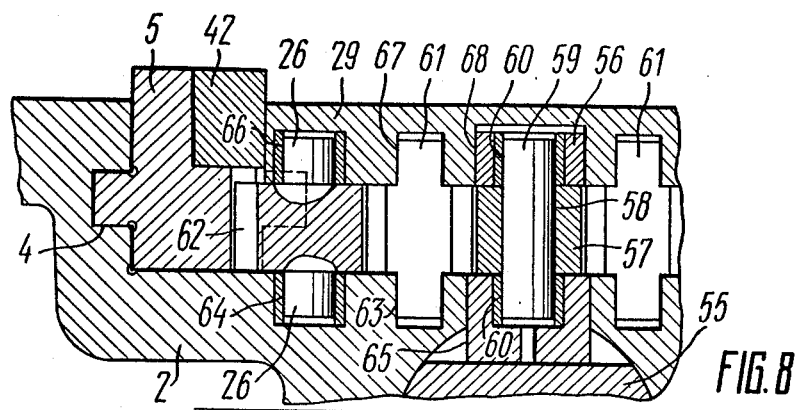
FIG. 8 is a sectional view taken on section line VIII—VIII of FIG. 7.
Figure 7:
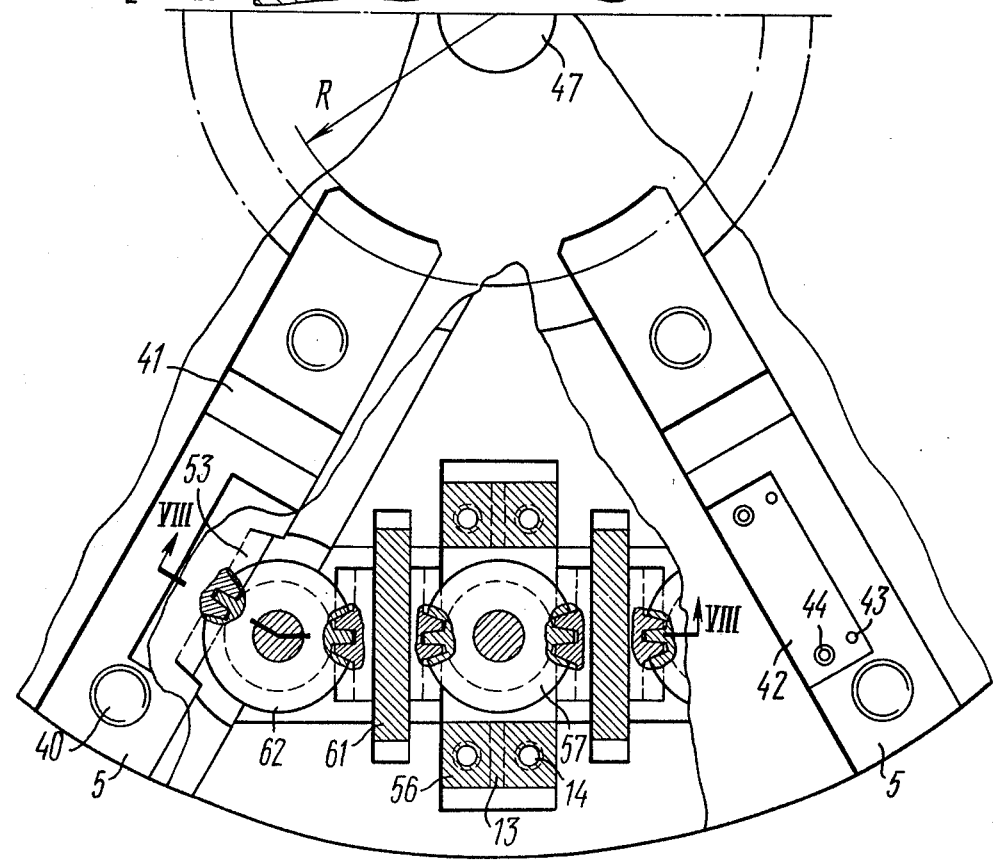
FIG. 7 is a fragmentary view of another embodiment of the driving train interconnecting a pair of adjacent jaws.

Now, let us refer to FIGS. 7 and 8 which illustrate still another embodiment of the driving train interconnecting a pair of the adjacent jaws in a clamping chuck constructed in accordance with the invention. Since the chuck in FIGS. 7 and 8 differs from the one illustrated in FIGS. 1 to 4 only in the structure of the driving chain, the positions identical with those in FIGS. 1 to 4 are indicated in FIGS. 7 and 8 with like reference numerals.

Each driving chain in FIGS. 7 and 8 includes a slide block 55 of a somewhat modified structure and a holder 56. As long as the slide block 55 can be of any suitable structure, and any one competent in the art is well able to modify the structure of the slide block for any practical embodiment, and in order not to overload the present disclosure with inessential details, the structure of the slide block in FIGS. 7 and 8 will not be described here in detail.

The holder 56 has rotatably mounted therein a pinion 57. A central aperture 58 of this pinion has a spindle 59 secured therein by pressure-fit. The spindle is received in sockets 60 provided in the holder 56 for the purpose, so that the pinion 57 is freely rotatable in these sockets acting as the bearings. The pinion 57 is operatively connected to each one of the jaws 5 of the respective pair through a double-sided toothed rack 61 and a pinion 62 meshing with the rack 53 of the respective jaw 5. The centering and correlated indexing of the holder 56, racks 61 and pinions 62 is effected by aligning the respective axes of the bearing sockets 63, 64 and 65 for the rack 61, journal 26 of the pinion 62 and holder 56, respectively, in the housing 2 with the corresponding axes of the bearing sockets 66, 67, 68, respectively, for the journal 26 of the pinion 62, rack 62 and holder 56 in the lid 69. The required positions of the respective sockets of the lid 69 with respect to the corresponding sockets of the housing 2 are established by means of pilot pins positioning the lid 69 relative to the housing 2. The lid and the housing are secured together with bolts (the pins and the bolts are not shown in the drawings).

Figure 10:
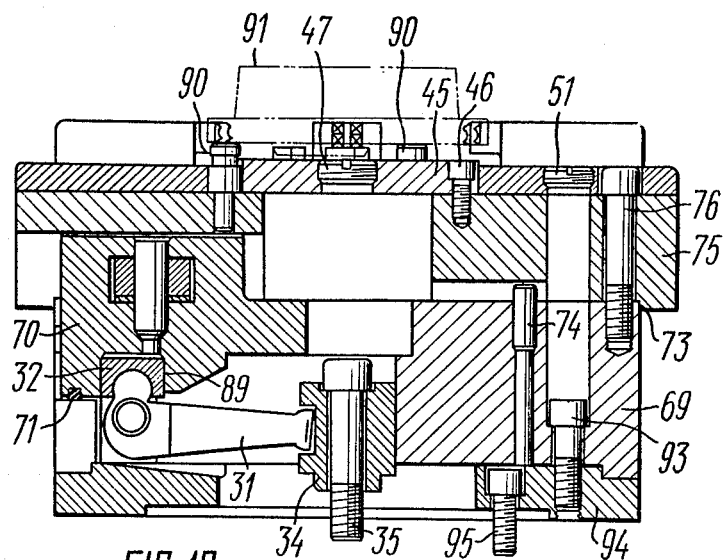
FIG. 10 is a sectional view taken on section line X—X of FIG. 9.
Figure 9:
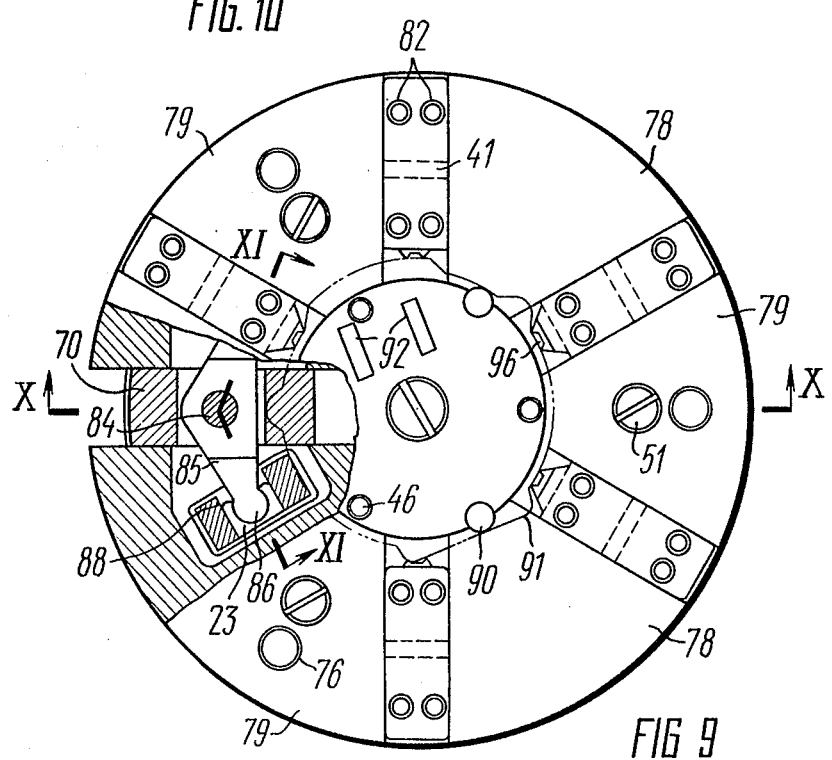
FIG. 9 is an end view of another embodiment of a centering clamping chuck in accordance with the invention.
Figure 11:
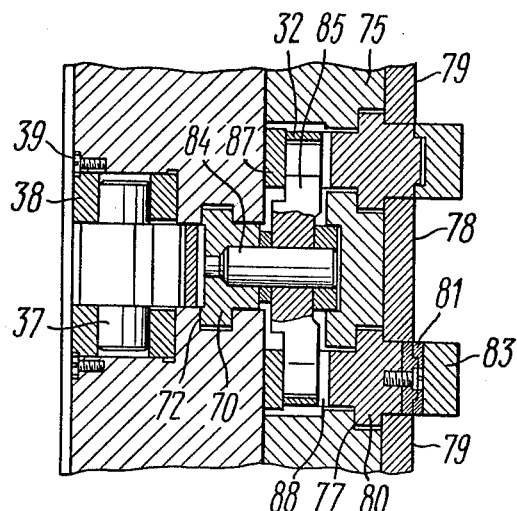
FIG. 11 is a sectional view taken on section line XI—XI of FIG. 9.

Let us refer now to FIGS. 9, 10 and 11 illustrating still another embodiment of the driving train for a pair of the adjacent jaws in a clamping centering chuck constructed in accordance with the invention.

In FIGS. 9 and 11 the positions identical to those in FIGS. 1 to 4 are indicated with like reference numerals.

The chuck illustrated in FIGS. 9, 10 and 11 differs from those already described hereinabove in that each driving train includes a prismatic driving or actuating side block carrying thereon a rotatable rocker with two identical arms with cylindrical heads on their ends, received each in a groove of the respective jaw of the pair. The jaw is either of a cylindrical shape or of a prismatic one. The head cooperates with this jaw through a movable block. So as to provide for self-positioning of each pair of the jaws against a distorted reference surface of a workpiece, the presently described embodiment incorporates this freely rotatable rocker with the identical arms, mounted on a shaft, instead of the cranks and pinions of the previously described embodiments. This mechanism is of a strong and durable structure and offers adequate rigidity.

The chuck illustrated in FIGS. 9, 10 and 11 includes a bottom part 69 of the housing and three slide blocks 70 uniformly spaced within the housing, having prismatic guideways and a seal 71, accommodated in the guideways 72 of the housing 69. The bottom part 69 of the housing supports thereon the upper part 75 of this housing, centered with aid of a surface 73 and angularly indexed with aid of a pin 74, the upper part 75 being secured to the bottom part 69 with screws 76. In the prismatic guideways 77 defined by the upper part 75 of the housing and gussets 78 and 79, positioned with aid of pilot pins and bolted to the upper part 75 (the pins and bolts are not shown in FIGS. 9, 10 and 11), there are accommodated the radial jaws each 80 having a keyway 41 for a key 81 and mounting apertures 82 which are used to position and secure the replaceable clamping parts 83 of the jaws 80. Each slide block 70 carries thereon a double-arm rocker 85 rotatable on a spindle 84 and having cylindrical heads 86 on the ends thereof, bearing upon supports 87. Each head 86 of the rocker 85 is received in a groove 88 provided in the bottom part of the jaw 80 and interacts therewith through the movable block 23.

The slide blocks 70, same as the slide blocks of the previously described embodiments, are radially reciprocated by the actuating rod of a drive (not shown) connected via the screw 35 to the coupling 34 which is operatively connected with the slide block 70 via the bell crank 31 connected with the slide block 70 through the movable block 32 received in a groove 89 provided in the slide block 70. The bell crank 31 has the journals 37 thereof received in the bearing sleeves 38 accommodated in the respective sockets of the housing and retained therein with the screws 39.

The opening in the upper part of the housing 75 is closed with the lid 45 fastened to the housing 75 with the bolts 46.

The aperture in the lid 45 is closed off with the plug 47.

The upper part 75 of the housing has three supports 90 for positioning a workpiece 91 (shown with dash-and-dot lines). Indexing abutments 92 are provided on the lid 45 for indexing angularly the workpiece 91 by its cast lug (not shown).

The chuck is fastened with screws 93 to a faceplate 94, and the openings in the housing, provided for these screws, are closed off with the threaded plugs 51.

Screws 95 are used to fasten the chuck to the flange of a spindle (not shown).

Shown with dash lines in FIGS. 9 and 10 is the inadequately rigid workpiece 91 clamped between the six replaceable jaws 83 by the base or reference surface of this workpiece, having a complicated irregular shape. To clamp this workpiece 91, there are used sharply pointed two-prong clamping members 96 of the replaceable jaws 83, which enable to secure firmly this inadequately rigid workpiece with these jaws, offering a high workpiece-holding capacity with a relatively small clamping effort.

Figure 14:
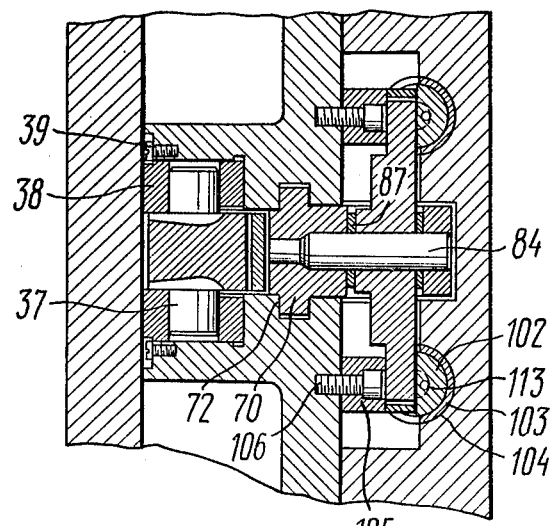
FIG. 14 is a sectional view taken on section line XIV—XIV of FIG. 12.
Figure 13:
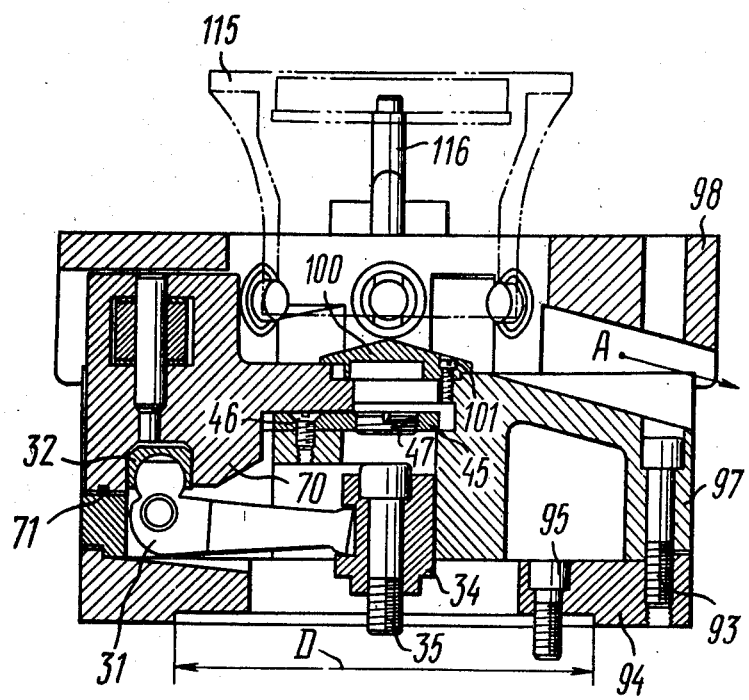
FIG. 13 is a sectional view taken on section line XIII—XIII of FIG. 12.
Figure 12:
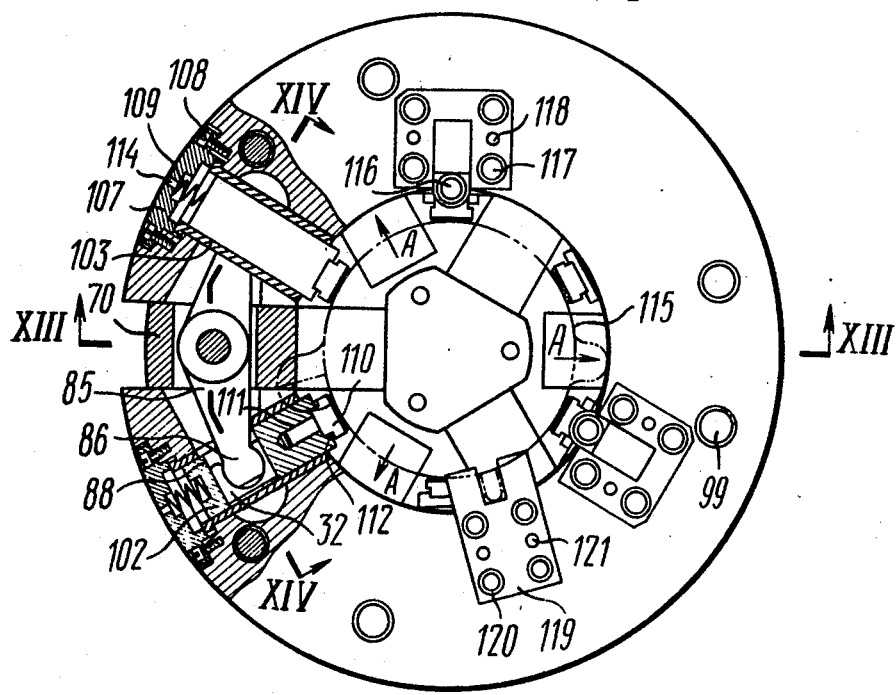
FIG. 12 is an end view partly cut-away, of a clamping chuck embodying the invention, similar the one shown in FIG. 9, but having plunger-type jaws.

Let us refer now to FIGS. 12, 13 and 14 illustrating a chuck with cylindrical jaws, having the same structure of the driving train, as the chuck in FIGS. 9, 10 and 11, although having some different features which present additional assets.

The presently described structure of the chuck illustrated in FIGS. 12, 13 and 14, in addition to the slide block, the double-arm rocker and other members described in connection with FIGS. 9, 10 and 11 and indicated with like reference numerals from 70 to 96 in FIGS. 12, 13 and 14, has several original components.

The housing 97 of this chuck, fastened to the upper part 98 with screws 99, defines three inclined passages indicated with arrows A, for removing shavings by centrifugal forces, as the chuck is rotated. The central opening 97 of the housing 97 is closed with a conical lid 100 fastened to the housing 97 with screws 101, providing for the removal of shavings. The cylindrical jaws 102 operatively connected to the respective rockers 85 are guided in sleeves 103 pressure-fit in the sockets 104 in the upper part 98 of the housing. To enhance the stability, each rocker 85 bears upon guiding supports 105 fastened with screws 106 to the housing 98.

At its rear side, each jaw 102 is closed by a lid 107 fastened with screws 108 to the upper part 98 of the housing. Interposed intermediate the lid 107 and the respective jaw 102 of a pair are motion-limiting members in the form of balancing springs 109 defining a certain middle position of the jaws 102 prior to clamping a workpiece. It should be noted that motion-limiting members providing for certain uniform radial positioning of the jaws prior to clamping an article can be incorporated, should it be practical, in the chucks previously described in connection with FIGS. 1 to 4, 5 and 6, 7 and 8.

Each jaw 102 is provided with replaceable clamping members 110, e.g. mushroom-shaped, the suitable clamping member 110 being mounted in the aperture 111 of the jaw 102. To prevent rotation of the replaceable clamping member 110, the head thereof has flats 112 engaging complementary slots 112 in the end face of the jaw 102. The replaceable clamping member 110 can be removed from the aperture 111 via an aperture 113 in the jaw 102 and an aperture 114 in the lid 107.

To clamp a workpiece with a flange, indicated in FIG. 13 with numeral 115, the chuck is provided with three supports 116 fastened to the housing 98 with screw 117 and positioned in place with pins 118.

When the workpiece 115 of a complicated shape, shown with dash-and-dot lines in FIG. 12, is to be clamped, there is used an indexing member 119 fastened to the housing 98 with screws 120 and positioned in place with pins 121, the indexing member 119 providing for securing the workpiece 115 in the chuck in a fixed angular position of this workpiece.

Figure 15:
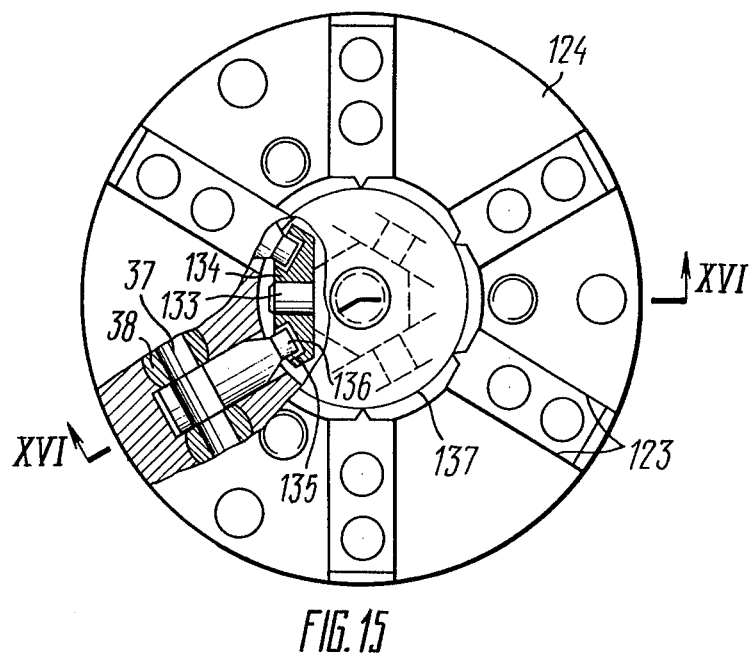
FIG. 15 is an end view, partly cut-away, of a still another embodiment of the invention in a centering clamping chuck.
Figure 16:
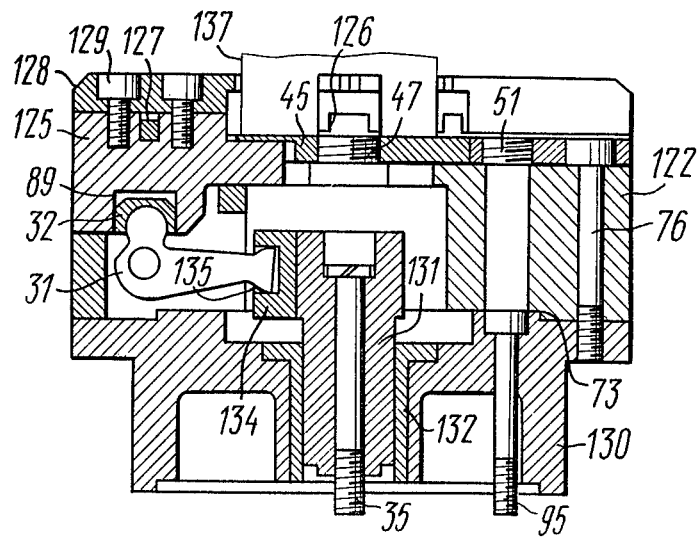
FIG. 16 is a sectional view taken on section line XVI—XVI of FIG. 15.

Let us finally refer to FIGS. 15 and 16 illustrating a still further embodiment of the driving train interconnecting two adjacent jaws in a clamping centering chuck constructed in accordance with the invention.

As the chuck illustrated in FIGS. 15 and 16 has many components having the same functions as their counterparts in the chuck described hereinabove in connection with FIGS. 9, 10, 11, the like parts are indicated in FIGS. 15 and 16 with the same numerals.

The chuck illustrated in FIGS. 15 and 16 includes a housing 122 of which the radial guideways 123 defined by the housing 122 and tempered gussets 124 fixed with respect to the housing with pilot pins and fastened thereto with screws (the pins and screws are not shown in drawings) accommodate the reciprocating jaws 125. The latter are provided each with side slots 126 and a key 127 to retain the replaceable clamping part 128 securable to the jaw 125 with screws 129.

The base 130 of the chuck includes a coupling 131 received in a sleeve 132 pressure-fit in an aperture in this base 130; the coupling 131 is connected via the screw 35 to the actuating rod (not shown). The upper portion of the coupling 131 has three journals 133 extending along of the coupling 131 has three journals 133 extending along the bisectors of the angles between the adjacent guideways 123 of each pair of the jaws. Each journal 133 supports thereon a freely rotatable bell crank 134 having a groove 135 in each end thereof.

Within each groove 135 there is received a barrel-shaped head 136 of the driving bell crank 31 of the respective adjacent jaw 125.

The bell crank 31 of each jaw has the journals 37 received in posts 38 accommodated in the respective sockets of the housing 122. The driven arm of each bell crank 31 is received within the groove 89 of the respective jaw 125 and interacts therewith through the movable block 32. The central opening in the chuck is closed with the lid 45, the latter is provided with the threaded plug 47. The chuck is centered with respect to the flange of the spindle of the machine tool by means of its annular shoulder "D" and is fastened thereto with the screws 95, the openings provided in the housing 122 for the passage of the screws 95 being closed with the threaded plugs 51.

Let us now discuss the operation of the herein disclosed chuck in its aforedescribed midifications. The chuck illustrated in FIGS. 1 to 4 is adjusted and operated, as follows. The chuck 1 is placed onto the faceplate of the spindle of a machine tool and centered with respect to this faceplate by means of the annular shoulder "D", whereafter the chuck 1 is fastened to the faceplate with the three screws 50. If the dimensions of the centering annular shoulder "D" does not correspond to the chuck-mounting diameter of the face-plate of the spindle of the machine tool in question, an adaptor faceplate is used, e.g. of the kind illustrated in FIG. 10, position 94.

First of all, replaceable clamping members are mounted onto the permanent jaws 5 to suit the particular kind of workpieces to be machined (the replaceable clamping members are not shown in FIGS. 1 to 4, but can be seen, for example, in FIGS. 9 and 15, positions 83 and 128, respectively). These replaceable clamping members are retained in the radial direction on the jaws 5 with a key received in the slot 41 and fastened with screws threaded into the threaded openings 40.

The radial displacement of the jaws 5 for clamping the workpiece received between the replaceable clamping members is effected, as follows.

The coupling 34 connected via the screw 35 to the actuating rod of the drive (not shown) is displaced axially, acting upon the bell cranks 31, each bell crank 31 acting through the respective block 32 upon the slide block 7 movable along the bisector of the angle between the respective pair of the adjacent jaws 5.

Each slide block 7 fast with the respective holder 11 carries a freely rotatable or pivotable bell crank 16 which actuates by its cylindrical heads 18 the respective jaws 5 of the pair via the intermediate bell cranks 19 and the movable blocks 22 and 23 accommodated, respectively, in the groove 21 of the bell crank 19 and in the groove 24 of the jaw 5.

When the coupling 34 is driven upward, i.e. away from the base of the housing 2, all the slide blocks 7 with their bell cranks 17 are displaced radially away from the centre of the chuck, while the bell cranks 19 drive the jaws 5 toward the centre of the chuck, which corresponds to clamping the workpiece by its external diameter. Should either one of the jaws 5 of any pair be the first to contact the body of the workpiece being clamped, the respective slide block 7 moves on radially until the respective bell crank 17, by pivoting relative to the arrested one of the bell cranks 19, drives the other jaw 5 of the pair into engagement with the workpiece.

In this way there is effected the centering of the workpiece by all of the jaws positioning themselves against the distorted reference surface of the workpiece, with the subsequent clamping of the latter with a uniform radial effort applied by each one of the jaws.

With the coupling 34 driven toward the base of the housing 2, the slide blocks 7 are displaced toward the centre of the chuck, while the jaws 5 are withdrawn from the centre of the chuck, which corresponds to clamping a workpiece by its internal diameter, or else to releasing a previously clamped workpiece.

In cases when during the adjustment of the chuck the supporting surfaces of the replaceable clamping members (not shown) are to be bored out in situ, i.e. in the machine tool, to ensure the strict concentricity of the surfaces to be machined with the base or reference surface of the workpiece, i.e. to the surface by which the workpiece is clamped in the chuck, a sample of a radius "R" is clamped by the jaws 5. In this position the supporting surfaces of the replaceable clamping members are bored out in the course of the adjustment to the radius required by the particular adjustment program (this radius is not shown in the drawings), whereafter the arcuate surfaces thus obtained are either used to clamp directly a workpiece, or else are utilized as bases onto which fluted clamping gaskets are attached to the jaws. The gaskets have a precisely gauged uniform thickness.

In cases when the jaws are devoid of an axial workpiece-mounting base, three supporting posts mounted intermediate the jaws can be used for the purpose, as it is shown in FIG. 12, position 116.

To attain an improved clamping capacity of the chuck for clamping workpieces having an unmachined reference surface, it is advisable to use jaws with sharp clamping edges, including single- and double-prong jaws made of a wear-resistant tool steel or else reinforced with a hard alloy.

To clamp articles of an intricate profile, like the one shown in FIG. 9, position 91, special-design jaws can be used, having different lengths to correspond to the respective radial dimensions of the workpiece, in which case additional components are used to index each workpiece into the proper angular position, like the parts shown in FIG. 9, position 92.

Taking into consideration the great clamping capacity of the chuck with the six radially reciprocable jaws, particularly, when these jaws are provided with pointed clamping surfaces, it is necessary to calculate the appropriate value of the axial effort applied to the coupling 34 by the actuating drive. To provide for the required clamping effort of the chuck; it should be born in mind that with the same clamping effort applied by a single jaw the chuck with the six jaws exerts, with the same kind of the replaceable clamping members, the clamping effort which is twice as great as that exerted by a chuck with three jaws, while the elastic deformation of an inadequately rigid workpiece is reduced to about one tenth. However, should the two kinds of chucks exert the same total clamping effort, the elastic deformation of the workpiece clamped in the chuck with the six jaws is but one twentieth in comparison with a chuck with three jaws.

It should be also born in mind that when particularly pliable inadequately rigid workpieces are to be clamped, each radially reciprocable jaw of the herein disclosed chuck with six jaws can be provided with a movable "floating" member with two clamping areas at the ends thereof, in which case the workpiece is clamped by the effort exerted by six pairs of clamping members of parallel action, which reduces still further the elastic deformation of the workpiece of this kind.

The adjustment and operation of the chuck described hereinabove in connection with FIGS. 5 and 6 are basically similar to those of the chuck illustrated in FIGS. 1 to 4.

The chuck shown in FIGS. 5 and 6 can be used for clamping relatively small articles which are machined with a relatively ligth cutting effort.

The chuck illustrated in FIGS. 7 and 8, the same as the chuck in FIGS. 5 and 6, is basically similar to the chuck shown in FIGS. 1 to 4; however, it is primarily intended for clamping large workpieces, e.g. bearing rings of a great diameter.

Let us now discuss the operation of the chucks illustrated in FIGS. 9 to 11 and FIGS. 12 to 14. When a workpiece is to be clamped in these chucks by its external diameter, the coupling 34 is driven toward the base of the chuck 1, whereas to clamp a workpiece by the internal wall of its bore, the coupling 34 is driven away from the base of the chuck 1. The chuck in FIGS. 9 and 11 is more metal and labour-consuming in its manufacture, but its advantage arises from the fact that its housing is assembled from individual forged articles, whereby the operation of casting the housing, which is a part of an intricate configuration, can be avoided. The individual components of the housing can be thermally treated in an appropriate manner.

The chuck shown in FIGS. 12 to 14 can be widely used for clamping workpieces both by their external and internal walls. In the last-mentioned case the cylindrical jaws 102 with their replaceable clamping members 110 are to be turned through 180°; however, only articles of a relatively great internal diameter can be handled.

When workpieces requiring a high precision of machining and those of a particularly low rigidity are to be handled, the cylindrical jaws 102 of this embodiment can be replaced with jaws having rockable double-area clamping members (not shown), to double the number of the points of the engagement between the workpiece and the chuck and thus to curb still further the elastic deformation of the workpiece.

In case of the chucks of this last-mentioned type, the cylindrical jaws 102 are prepared, in general, individually for each basic dimension of the workpieces to be handled by being clamped either by their external or by their internal diameter.

The range of the dimensions of the workpieces that can be clamped in the chuck of this type is relatively narrow, the variabion of the dimensions is attainable by either varying the height of the replaceable clamping members 110 or by replacing the permanent jaws 102 with jaws of a different length.

The chucks of the kind illustrated in FIGS. 15 and 16 are predominantly intended for clamping relatively small articles machined in multi-spindle machines, although in principle a chuck of this kind can be used for clamping greater workpieces.

The levelling-out mechanism employed in these chucks limits the extent of the radial compensation of the displacement of the jaws; therefore, the chucks are preferably used for clamping articles with relatively small variations of the shape of their reference or clamping diameter.

When a workpiece 137 is to be clamped in a chuck of the type shown in FIGS. 15 and 16, e.g. by its external diameter, the coupling 131 is driven downward, i.e. toward the base of the chuck, the bell crank 134 in this case cooperating with the driving arms of the effort-transmitting bell cranks 31 of the respective pairs of the jaws 125, thus driving the latter toward the centre of the chuck.

When either one of the replaceable clamping members 128 of an adjacent pair of the ajws engages the workpiece 137, the coupling 131 moves onward, pivoting the bell crank 134 on the journal 133 with respect to the jaw that has already contacted the workpiece, until the other clamping member 128 of the pair also engages the workpiece 137. If by this time the second and the third pairs of the jaws fail to engage the reference or base surface of the workpiece, the coupling 131 moves on, driving the first-mentioned pair of the clamping members 128 toward the centre of the chuck, until the rest of the clamping members likewise engage the surface of the workpiece, which latter is thus centered and clamped at the same time.

Any one of the abovedescribed chucks illustrated in FIGS. 1 to 16 can be associated with hydraulic, pneumatic and electric actuating drives by simply connecting the rod of the available drive to the coupling 34 of the chuck, this coupling 34 actuates the jaws of the chuck through the respective driving trains.

Chucks constructed in accordance with the present invention can be broadly used for clamping articles that are to be machined at high productivity and with a high accuracy, e.g. various parts for motor vehicles and other machines, rings and races for antifriction bearings, etc.

With the jaws being reciprocable in the radial direction, there is effected reliable centering of the workpiece, with provisions for clamping a workpiece with sharply pointed clamping members, e.g. single-prong ones, which even at a relatively small clamping effort, cut into the surface of the workpiece and thus offer a great workpiece-holding capacity of the chuck, whereby the workpiece can be machined with a higher productivity and precision.

What we claim is:

1. A centering clamping device comprising: a housing; means defining guideways radially arranged in said housing from the periphery toward the center thereof; paired clamping jaws accommodated in said guideways for reciprocation therealong toward and away from the center of said housing to position a workpiece at the center of said housing of the clamping device and to retain said workpiece in a centered position; driving trains in a number corresponding to the number of pairs of said clamping jaws, each said driving train operatively interconnecting two adjacent ones of said clamping jaws, in at least three groups of symmetrically arranged pairs of said clamping jaws; a drive common to all said pairs of the jaws for displacement thereof toward and away from the center of said housing; each said driving train including a member operatively connected to said drive and mounted for reciprocation along a bisector of an angle defined by the guideways of each respective pair of said clamping jaws, each said member carrying thereon a freely rotatable element having an axis of rotation situated on said bisector of the angle between the respective clamping jaws of a pair, means connecting each said element with each one of said clamping jaws of the respective one of said pairs so that when one of said clamping jaws of said pair contacts the workpiece, the other said clamping jaw of said pair is moved into engagement with the workpiece, whereby all said pairs of said clamping jaws simultaneously displace the workpiece with efforts directed substantially toward the center of said housing.

2. A centering clamping device as claimed in claim 1, wherein each said driving train includes a slide block disposed on the bisector of said angle defined by the corresponding pair of the adjacent guideways of said clamping jaws of the pair, said slide block having mounted thereon a pivotable bell crank with cylindrical heads, each head being operatively connected with a respective one of said clamping jaws via an effort-transmitting bell crank having in an extremity thereof, facing the cylindrical head, a groove receiving therein a block cooperating with the cylindrical head of the first-mentioned bell crank, the other extremity of the effort-transmitting bell crank having a cylindrical head received in a groove provided in the respective one of said clamping jaws, the last-mentioned groove accommodating therein a movable block and effort-transmitting bell cranks having respective grooves for respective ones of said heads.

3. A centering clamping device as claimed in claim 1, wherein each said driving train includes a slide block disposed on the bisector of an angle defined by the respective pair of adjacent guideways of said clamping jaws of the corresponding pair, each slide block supporting thereon a respective rotatable pinion, each one of said clamping jaws of the respective pair having a toothed rack operatively connected to the corresponding pinion on the slide block through a toothed segment.

4. A centering clamping device as claimed in claim 1, wherein each said driving train includes a slide block disposed on the bisector of an angle defined by the corresponding pair of the adjacent guideways of said clamping jaws of the pair, each slide block supporting thereon a rotatable pinion operatively connected with a toothed rack on each one of the respective ones of said clamping jaws through a rack-and-pinion couple, each clamping jaw having a rack-and-pinion thereon, and said couple.

5. A centering clamping device as claimed in claim 1, wherein each said driving train includes a driven slide block carrying thereon a rocker with identical arms, said arms of each rocker being operatively connected with the respective ones of said jaws of the corresponding pair.

6. A centering clamping device as claimed in claim 1, wherein each said driving train includes a pair of adjacent bell cranks pivotable in the planes of the reciprocation of the respective ones of said jaws of the pair, said housing of the clamping device having mounted therein a coupling reciprocable along the longitudinal axis of the device, carrying three rods extending along the bisectors of the respective angles formed by the guideways of the respective pairs of said clamping jaws, each said rod carrying another bell crank operatively connected to the said first-mentioned bell cranks to effect their pivoting in the planes of the reciprocation of the respective ones of said jaws.

7. A centering clamping device as claimed in claim 6, wherein said another bell cranks are pivotable in the planes of the reciprocation of the respective rods of the drive, perpendicular to the longitudinal planes including the respective bisectors of the angles between the pairs of said guideways.

8. A centering clamping device as claimed in claim 1, wherein said drive includes a hydraulic cylinder having a plunger rod thereof operatively connected with the slide blocks of all said driving trains.

9. A centering clamping device as claimed in claim 1, wherein said drive includes a pneumatic cylinder having a plunger rod operatively connected with the slide blocks of all said driving trains.

* * * * *